United States Patent [19]

Scardina, deceased et al.

[11] 4,450,318

[45] May 22, 1984

[54] MEANS AND METHOD FOR PROVIDING INSULATION SPLICE

[75] Inventors: Virgil R. Scardina, deceased, late of Norwood, Ohio; by Annette Scardina, executrix, Milford, Ohio

[73] Assignee: Siemens-Allis, Inc., Atlanta, Ga.

[21] Appl. No.: 307,080

[22] Filed: Sep. 29, 1981

[51] Int. Cl.$^3$ .............................................. H01R 4/70
[52] U.S. Cl. .................................. 174/84 R; 156/48; 156/49; 156/52; 156/56; 156/86; 174/76; 174/DIG. 8
[58] Field of Search ....................... 156/48, 49, 84, 85, 156/51, 52, 53, 56, 86; 174/84 R, DIG. 8, 76; 339/116 C, 116 R

[56] References Cited

U.S. PATENT DOCUMENTS

| | | | |
|---|---|---|---|
| 2,958,722 | 11/1960 | Rubin et al. | 156/49 X |
| 3,691,505 | 9/1972 | Graves | 174/84 R X |
| 3,889,047 | 6/1975 | Carver | 174/84 R |
| 3,895,180 | 7/1975 | Plummer | 174/76 X |
| 3,992,569 | 11/1976 | Hankins et al. | 174/76 X |
| 4,403,110 | 9/1983 | Morrisette | 174/84 R |

FOREIGN PATENT DOCUMENTS 141889  5/1980  German Democratic Rep. ... 156/49

Primary Examiner—Robert A. Dawson
Attorney, Agent, or Firm—John L. James

[57] ABSTRACT

An improved method of joining insulated conductors and providing a water-tight seal. The area about the joined conductors is filled with a putty-like insulation filler material and an O-ring placed on the conductor insulation, some distance from the joint. The joint, including the O-ring, is overtaped with resin-rich insulation tape and the tape is surrounded by a shrinkable polyester film. Heat is applied to partially cure the insulation tape, and to cause the polyester film to contract tightly about the joint.

12 Claims, 2 Drawing Figures

MEANS AND METHOD FOR PROVIDING INSULATION SPLICE

BACKGROUND OF THE INVENTION

The present invention relates to electrical insulation, and more specifically to an improved means and method for splicing together the insulation of a pair of cables whose conductors have been joined.

Whenever insulated electrical conductors are joined it is usually necessary to replace the insulation over the exposed, joined sections of conductor. In some cases both the provision of insulation and the mechanical joining of the conductors can be accomplished in one step, as by means of an insulated wire connector or "wire nut." In other cases, particularly with small conductors and in low-voltage applications, preformed insulation devices such as shrinkable polyester sleeves can be applied to the joint, providing a quick and easy means of insulating the exposed conductors.

In other applications, however, the problem is more difficult. When high voltages are present or large conductors used, frequently insulation splices must be hand made by taping the joints and/or applying insulation materials in liquid or paste form. Further, many applications require that a splice be water-tight, and that it be able to withstand many years' hard usage in hot, abrasive, or other hostile environments.

One example of such an application is the attachment of leads to the windings of large electric motors. Owing to the nature of the conductors used for electromagnetic windings they are frequently unsuitable for use as leads, and are terminated within the motor housing and connected to other, flexible cables which are then brought out of the motor to serve as connection leads. Such splices must be physically strong and resistant to heat, water, abrasion and motion, since a failure of the splice would require disassembly of the motor. In the past such splices have conventionally been made by brazing the conductors together, then overtaping the joint with a variety of tapes of types which are commonly known within the electrical insulation field such as Dacron polyester, woven glass, mica tapes, and combinations of the above impregnated with various resins and adhesives. The tape splices are in some cases separately cured by the application of heat, or by the use of an air-dry resin. In other cases, the splices were made before immersing the motor windings in a varnish bath or a vacuum-pressure impregnation (VPI) vessel, so that the splice became thoroughly impregnated and cured.

With the advent of newer, improved insulation materials, particularly synthetic materials, generally improved insulation characteristics have resulted. However, new insulation materials have given rise to additional problems in the manufacture of motors. For instance, cables of the sort which are well adapted to form motor leads are insulated with materials of a type which do not form cohesive bonds with the impregnants, adhesives and resins which are used to form insulation splices. For instance, materials utilizing silicones, fluoroethylenes and polyethylenes frequently do not adhere to the tapes and resins conventionally used to form insulation splices. This results in a joint which is not water-tight, and which does not have the physical integrity of prior art joints. Yet another problem arises when such leads are attached to motor windings before VPI treatment. While the lead insulation material is not porous, it is slightly resilient and the hydraulic forces involved in the VPI process will drive liquid resin into the leads, beneath the insulation and along the conductors throughout the length of the lead. As the resin cures the lead becomes hard and rigid, defeating the flexibility which is ordinarily necessary.

One way of overcoming this problem has been to splice extra-long lead cables to motor windings, and extend the free ends of the cable above the level of the resin during the VPI process so that the resins would impregnate the motor windings and the insulation joint between the windings and leads, but would not enter the leads themselves. This approach, however, is time consuming and wasteful of lead material. Further, it precludes the VPI treatment of large numbers of motors, unless the lower tiers of motors which are to be deeply immersed in the VPI resin are provided with extra-long leads, which must subsequently be cut short, wasting still more of the expensive lead material.

It will therefore be appreciated that it would be highly desirable to provide a method of splicing lead cables to already-impregnated conductors which will provide a water-tight joint, and which does not require subsequent impregnation.

It is therefore an object of the present invention to provide an improved insulation splice for electrical conductors.

Another object is to provide a method of splicing conductor insulations which does not rely upon adhesion to the conductor insulation.

Yet another object is to provide an improved, flexible insulation joint which is water-tight.

Another object of the invention is to provide a method of sealing later-applied insulation material about a cable insulated with a nonadhesive synthetic material.

SUMMARY OF THE INVENTION

Briefly stated, in accordance with one aspect of the invention the foregoing objects are achieved by securing together the exposed ends of the conductor material of a pair of insulated conductors. The exposed conductor is then surrounded with a mass of insulation material having a putty-like consistency, and an O-ring placed about the insulation of at least one of the conductors at a point spaced from the exposed conductors. The joint, including the O-ring, is then overtaped with at least one layer of a flexible resin-filled insulation tape, and a layer of a shrinkable polyester film disposed over the tape. Finally heat is applied to soften, and preferably partially cure, the resin filled tape; and to cause the shrinkable polyester film to contract tightly about the joint, urging the tape and the O-ring into a water-tight sealing relationship with the cable insulation.

In a preferred embodiment, the putty-like insulation material is formed of silicone rubber, which is partially cured by the application of heat to the joint.

BRIEF DESCRIPTION OF THE DRAWING

While the specification concludes with claims particularly pointing out and distinctly claiming the subject matter which is regarded as the invention, it is believed that the invention will be better understood from the following description of a preferred embodiment taken in conjuction with the accompanying drawing in which:

DESCRIPTION OF A PREFERRED EMBODIMENT

Figure 1:
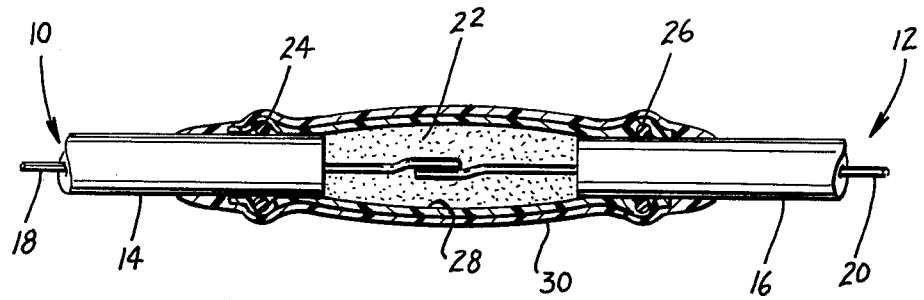
FIG. 1 is a partly sectioned illustration of an insulation joint embodying principles of the present invention.

FIG. 1 illustrates the structure of a splice formed between a pair of insulated cables 10, 12 which include insulation sheaths 14, 16 and conductors 18 and 20, respectively. While the depicted cables are of the same type, it will be recognized that the invention is equally applicable to splices between cables having insulations of different sizes, shapes and compositions.

As shown, the insulation is stripped away from the ends of the conductors, which are joined together by appropriate means such as soldering or brazing. A mass of insulation filler material 22 surrounds the conductors, and a pair of O-rings 24 and 26 tightly surround insulation sheaths 14 and 16, respectively.

A layer of tape 28 extends over the O-rings and about the joint, as shown. Finally, a layer of shrinkable polyester material 30 surrounds the joint, tightly compressing the tape and the O-rings about the cable insulation.

The depicted structure has been found to work extremely well with cable insulations formed of synthetic materials such as silicones, fluoroethylenes and polyethylenes, to which conventional insulation materials and resins do not readily adhere. Better adhesion is provided by other cable insulation materials, such as chlorosulfonated and natural elastomeric compounds, but the physical and insulative properties of the latter materials are not as desirable as those of the former. The problem to be overcome is then to provide a splice which affords a watertight seal with such non-adherent materials, particularly in an environment such as the interior of large electric motors, wherein it is desirable to couple a flexible cable to an already-impregnated motor winding. The use of such a splice further allows the motor windings to be impregnated, for instance with resin in a VPI process, without subjecting the leads to the process and causing them to lose their flexibility.

In order to form the insulation splice of FIG. 1, the insulation 14 of cable 10 and insulation 16 of cable 12 is stripped back from the conductors, allowing lengths of conductor to be exposed. The exposed conductors are then cleaned either chemically or mechanically, as by means of a wire brush or the like, and then fastened together by brazing, soldering or other convenient method. A putty-like mass of insulation compound 22 is then applied to the joined conductors, filling voids about them and extending to a diameter which is roughly equivalent to that of the insulated conductors. While various sorts of deformable insulation material may be selected for use, in a successfully tested embodiment RTV (room temperature vulcanizing) putty, a silicone rubber material commonly used in industrial environments, was utilized. A pair of O-rings 24 and 26 formed of an elastomeric material, preferably butyl rubber, were placed over the cable insulation at points spaced from the conductor connection. The spacing of the O-rings is not critical, although they should be far enough from the ends of the insulation to prevent their being inadvertently pushed off the insulation, into the area of the RTV putty. The O-rings should fit snugly about the cable insulation. While the cables commonly used are circular in cross section, it will be recognized that the elastomeric O-rings readily adapt to various cable shapes. It should be understood, however, that by the term "O-ring" is meant a loop of elastomeric material, whether or not it actually conforms to a circle and that for some applications generally rectangular or oddly-shaped O-rings may be selected for better conformance with the surface of the insulated cable.

The next step in forming the joint is to apply at least one layer of a flexible tape 28 over the joint. As illustrated, the tape should extend on either side of the O-rings, forming a generally continuous sleeve which extends from the surface of one cable to the other and covering the putty-like insulation which surrounds the joined conductors. Preferably, the joint, including the O-ring, is overtaped with resin-rich insulation tape and the tape is surrounded by a shrinkable polyester film. In a successfully-tested embodiment a single layer of a felted polyester tape, impregnated with curable resin, was used. Such a tape has the advantage of being sufficiently flexible to conform to the joint, including the irregular surface produced by the presence of the O-rings. Each winding of tape 28 should be overlapped, preferably with a ½-lap application, so that none of the material beneath it is exposed. Finally, a layer of shrinkable polyester film is applied along at least the length of the tape, so that it extends from one cable insulation surface to the other. With presently-preferred embodiment of the invention, a heat shrinkable polyester film marketed under the trademark "Mylar" by the E. I. Dupont deNumours Co. of Wilmington, Del. was utilized. The polyester film is advantageously applied as a self-adhesive tape which is wound tightly about the joint and overlapped, preferably by a ½-lap, so that none of the underlying material is exposed. It will be recognized, however, that for some applications it may be found expedient to use a pre-formed tube or sleeve of a shrinkable material, and the selection of such alternatives is deemed well within the skill of those familiar with the pertinent art.

After construction of the splice, sufficient heat is applied to cause the shrinkable film 30 to contract tightly about the joint. In a preferred embodiment the heat causes the resin-filled tape 28 to soften and to cure partially, allowing it to conform closely to the surfaces of the cable insulations 14, 16; O-rings 24 and 26, and insulation putty 22. In addition the heat serves to soften the putty, causing it to flow slightly into any voids about the conductors, and to partially cure so that it adds to the strength of the structure, while remaining somewhat elastomeric.

Upon understanding the present invention, it will be seen that the constrictive force applied by the shrinkable film 30 serves to compress O-rings 24 and 26 tightly upon the surfaces of cables 10 and 12. The outer edges of the O-rings are in intimate contact with tape 28, affording a high-integrity mechanical seal for the depicted structure.

Figure 2:
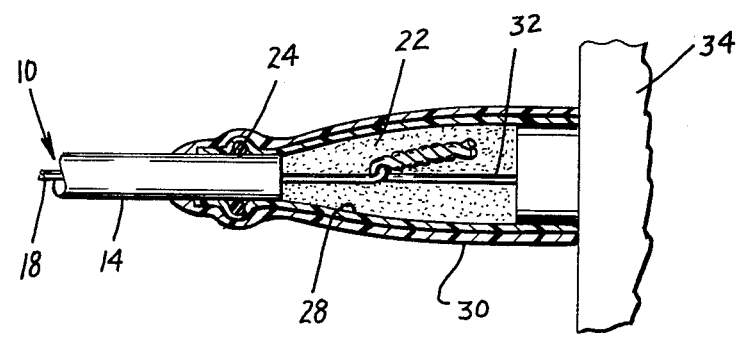
FIG. 2 is another insulative joint made in accordance with the invention.

Referring now to FIG. 2, in which structural elements corresponding to FIG. 1 are denoted by similar numerals, a conductor 32 extends from surrounding material 34 which may represent a preformed terminal or various other insulation system surrounding the conductor. The nature of the material of structure 34 is such that it forms a good bond with the adhesives or impregnants of tape 28, so that the mechanical seal afforded by the O-ring 26 of FIG. 1 is unnecessary. Further, conductors 18 and 32 have been mechanically joined by twisting them together rather than by soldering or brazing. In order to provide a water-tight insulative splice, putty-like insulating compound 22 is applied about the joined conductors, and O-ring 24 is disposed about the insulation of cable 10. Tape 28 is then applied and extends from the surface of the cable to structure 34, and finally the entire joint is covered by taping with shrinkable polyester film 30. As described above, heat is then applied, in at least an amount to cause the shrinkable film to contract tightly about the joint, and to cause the impregnant of tape 28 to flow sufficiently to adhere to structure 34 and to conform to the surface of the various elements within of the joint. If desired, additional heat can be applied to cause tape 28 and putty 22 to cure to effecting further mechanical support although in most instances this is not thought to be necessary. The compressive action of the shrinkable polyester film forces the inner periphery of O-ring 24 into tight, water-resistant contact with the surface of cable 10, providing an elastomeric mechanical seal which resists the ingress of water even in the absence of an adhesive bond between the polyester or the tape and the surface of the cable.

It will now be appreciated that the present invention provides an improved method for obtaining a splice whereby high-integrity insulation joint is provided without the need for chemical compatibility for adhesion of the materials used with the surface of the conductors being joined. As will be evident from the foregoing description, certain aspects of the invention are not limited to the particular details of the examples illustrated, and it is therefore contemplated that other modifications or applications will occur to those skilled in the art, including the substitution of alternative materials for those specified by way of example above. It is accordingly intended that the appended claims shall cover all such modifications and applications as do not depart from the true spirit and scope of the invention.

What is claimed as new and desired to be secured by Letters Patent of the United States is:

1. The method of forming a water-tight splice in the insulation of two electrical cables, comprising the steps of
   securing the ends of the conductors of the cables together in electrically conductive relationship;
   applying an insulative filler material having a putty-like consistency about the secured ends of the conductors;
   disposing an O-ring about the insulation of each of said cables at points spaced from the secured ends of the conductors;
   applying at least one layer of a flexible tape extending from the insulation of one cable to that of the other and covering said O-rings;
   disposing a layer of shrinkable insulating material over said tape; and
   causing said shrinkable insulating material to shrink.

2. The method defined in claim 1, wherein heat is applied to cause said shrinkable insulating material to shrink.

3. The method defined in claim 2, wherein said tape is a flexible resin-filled tape, and wherein the application of heat is sufficient to both cause said shrinkable material to contract, and to at least partly cure the resin in said tape.

4. The method defined in claim 3, wherein said shrinkable insulating material is a polyester film.

5. The method defined in claim 4, wherein said filler material is comprised of silicone rubber.

6. The method defined in claim 4, wherein the exterior surfaces of said cables are generally circular in cross section.

7. The method of forming a water-tight insulation joint about the insulation of an electrical cable having an exposed conductor portion, comprising the steps of
   applying an insulation material having a putty-like consistency about the exposed conductor portion;
   disposing an O-ring about the insulation of said cable at a point spaced from the exposed portion of the conductor;
   applying at least one layer of a flexible insulation material extending from a point on the cable insulation lying on the other side of said O-ring from the exposed conductor, across the O-ring, and at least about the area of the exposed conductor;
   disposing a layer of shrinkable insulating material over said layer of flexible insulation material; and
   causing said shrinkable insulating material to contract.

8. The method defined in claim 7, wherein heat is applied to cause said shrinkable material to contract.

9. The method defined in claim 8, wherein said flexible insulation material comprises a resin-filled tape.

10. An improved water-tight insulating joint for an insulated cable having a section of exposed conductor, comprising
    a mass of insulation material disposed about said exposed conductor;
    an O-ring disposed about the insulation of said cable at a point spaced from said exposed conductor;
    at least one layer of resin-filled tape extending from a point on said insulation spaced from said O-ring, on the side of the O-ring remote from the exposed conductor, at least to a point about said exposed conductor; and
    a layer of shrinkable polyester material extending over said resin-filled tape, said polyester material exerting a compressive stress on said tape and said O-ring.

11. The invention defined in claim 10, wherein said mass of insulative material is formed by disposing a putty-like mass of said material about said conductor.

12. The invention defined in claim 11, wherein said compressive force is provided by applying heat to said shrinkable polyester material.

* * * * *